United States Patent [19]

Lüderitz

[11] 4,089,047
[45] May 9, 1978

[54] TRIFOCAL MIRROR-REFLECTOR

[76] Inventor: Willy Lüderitz, Westerbachstrasser 27, Lubbecke, Germany, 4990

[21] Appl. No.: 725,970

[22] Filed: Sep. 23, 1976

[30] Foreign Application Priority Data

Apr. 26, 1976 Germany .............................. 2618188
Apr. 26, 1976 Germany .............................. 2618187

[51] Int. Cl.² .............................. F21V 7/00; F24J 3/02
[52] U.S. Cl. ....................................... 362/297; 126/271
[58] Field of Search ................. 240/41.36, 41.35, 41.3, 240/103 A, 103 R, 103 B; 126/270, 271; 362/297

[56] References Cited

U.S. PATENT DOCUMENTS

| 1,014,972 | 1/1912 | Nichols ................................. 126/271 |
| 1,153,443 | 9/1915 | Pole ..................................... 240/103 B |
| 1,341,674 | 6/1920 | Rhodin ................................. 240/41.36 |
| 2,560,281 | 7/1951 | Doane ................................ 240/103 R X |
| 4,002,499 | 1/1977 | Winston ............................. 240/103 B X |

FOREIGN PATENT DOCUMENTS

| 25,961 | 5/1920 | Denmark ......................... 240/41.3 C |
| 864,684 | 1/1953 | Germany .......................... 240/41.35 |
| 808,701 | 7/1951 | Germany .......................... 240/103 R |
| 6,405,515 | 11/1965 | | |
| 287,682 | 8/1931 | Italy ............................... 240/41.35 D |

*Primary Examiner*—Donald A. Griffin
*Attorney, Agent, or Firm*—Ostrolenk, Faber, Gerb & Soffen

[57] ABSTRACT

A compound reflector having a cross section in the form of a trifocal reflector is disclosed. The cross section of the compound reflector comprises a first reflector section formed along an arc of a first ellipse and a second reflector section formed along an arc of a second ellipse. Both ellipses share a common focal point which may be either the proximal or distal focal points of each reflector section.

18 Claims, 12 Drawing Figures

TRIFOCAL MIRROR-REFLECTOR

The present invention relates to various forms of trifocal mirror-reflectors, more particularly, mirror-reflectors having a cross section which forms a trifocal reflector.

Each of the reflectors of the present invention have a cross section which comprise a first reflector section formed along an arc of a first ellipse and a second reflector section formed along an arc of a second ellipse. The first and second ellipses have proximal and distal focal points and both ellipses share a common focal point. There are two main embodiments of the present invention. In the first embodiment, the compound reflector is symmetrical about a central axis running through the common focal point of the two reflector sections perpendicular to and passing through a line connecting the two non-common focal points of the reflector sections. In this embodiment, the reflector is a circular reflector whose cross section is identical along any plane passing through the central axis.

The foregoing embodiment can take two major forms. In the first form, the common focal point is the proximal focal point of both reflector sections and a punctiform light source is placed at the common focal point. In this case, a relatively broad column of light is produced which is concentrated along a circular arc representing the non-common focal points of the compound reflector. In a second form of this embodiment, the common focal point is the distal focal point of the reflector sections and a circular light source is placed among an arc representing the non-common focal points of the compound reflector. In this form, a more concentrated light pattern is produced and the light rays reflecting off the compound reflector concentrate at the common focal point.

In the second major embodiment of the present invention, the compound reflector is elongated along a central arc passing through the common focal point of the compound reflector perpendicular to but not passing through a line connecting the non-common focal points of the reflector sections such that the compound reflector forms a trifocal reflector along any plane running perpendicular to the central axis.

The second major embodiment also takes two major forms. In the first form, the common focal point is the proximal focal point of both reflector sections and an elongated lamp is placed along the central axis. In a second form of this embodiment, the reflector is used not as a light source but as a light accumulator. In this embodiment, the common focal point is also the proximal focal point of the two reflector sections and the rays of the sun are reflected off of the two reflector sections to heat a liquid or gaseous material situated within an elongated pipe running along the central axis of the compound reflector.

BRIEF DESCRIPTION OF THE DRAWINGS

For the purpose of illustrating the invention, there is shown in the drawings several embodiments which are presently preferred; it being understood, however, that this invention is not limited to the precise arrangements and instrumentalities shown.

DETAILED DESCRIPTION OF THE INVENTION

Figure 1:
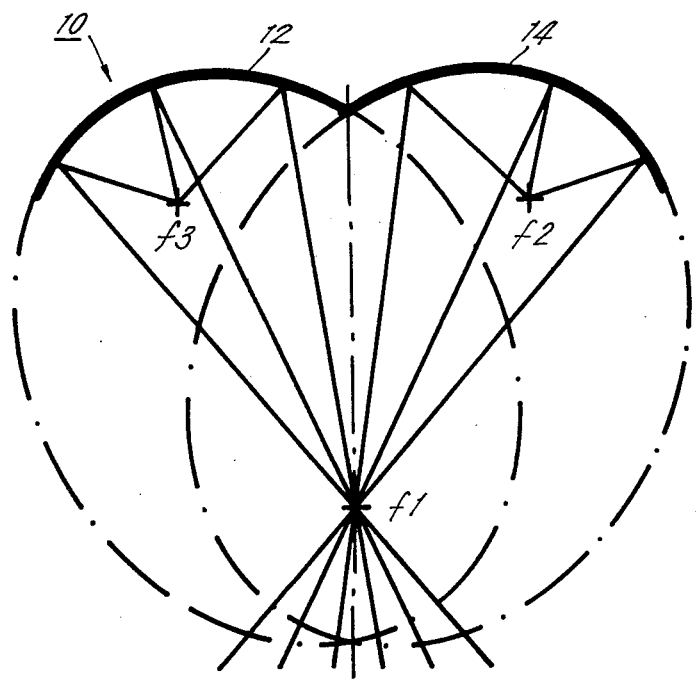
FIG. 1 is a schematic view of a first form of a trifocal mirror.
Figure 2:
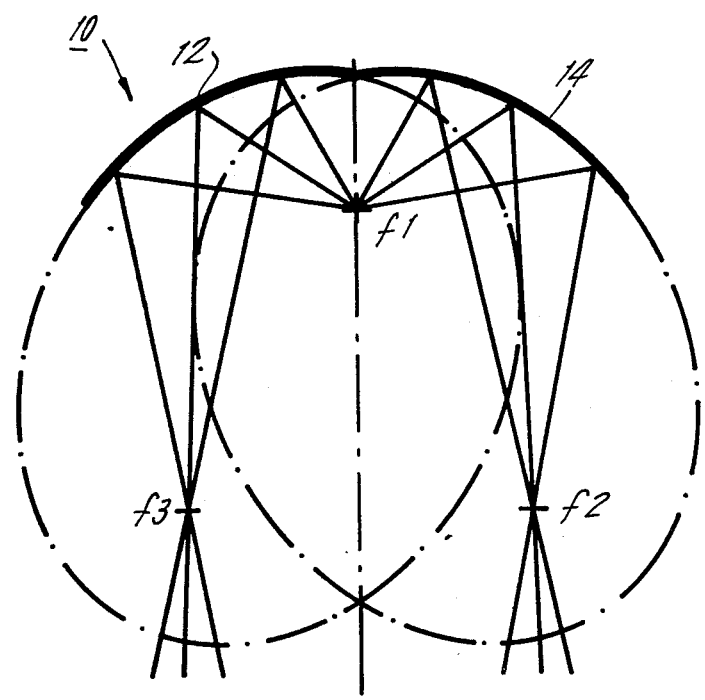
FIG. 2 is a schematic view of a second form of a trifocal mirror-reflector.

Referring now to the drawings wherein like numerals indicate like elements, there is shown in FIGS. 1 and 2 a reflector constructed in accordance with the principles of the present invention and designated generally as 10. Reflector 10 comprises a first reflector section 12 and a second reflector section 14 which share a common focal point $f1$. In the embodiment illustrated in FIG. 1, the common focal point $f1$ is the focal point most distant from reflector sections 12 and 14. In the embodiment illustrated in FIG. 2, the common focal point $f1$ is the focal point least distant to reflector sections 12 and 14.

Reflector sections 12 and 14 need be elliptical only in cross section. Thus, reflector 10 may take many varied forms some of which are described in detail below. In all cases, the length of focal point lines $f1—f2$ and $f1—f3$ may be, but are not necessarily, equal.

Figure 3:
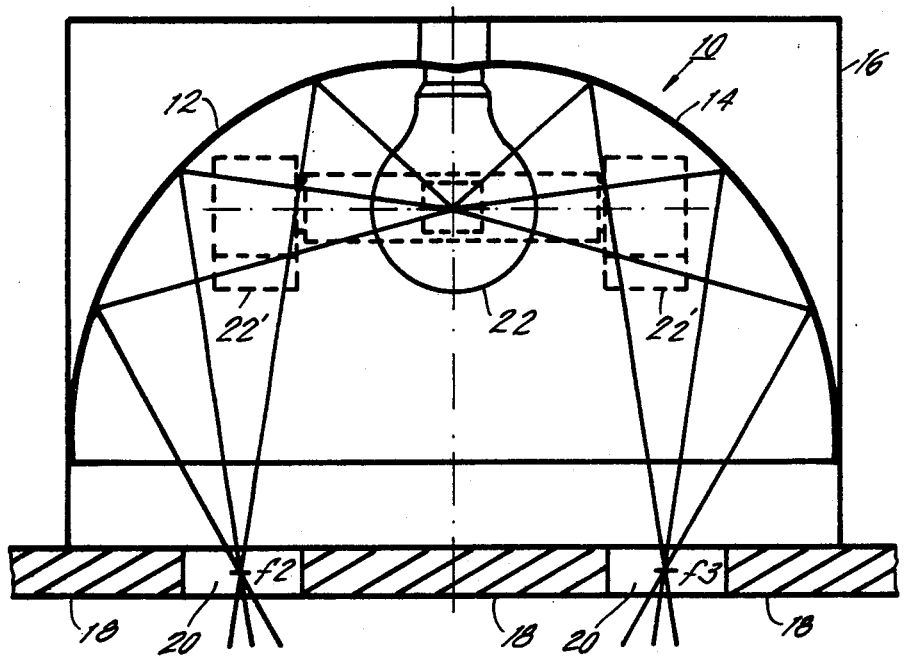
FIG. 3 is a bottom view of a lamp assembly utilizing a trifocal mirror-reflector.
Figure 4:
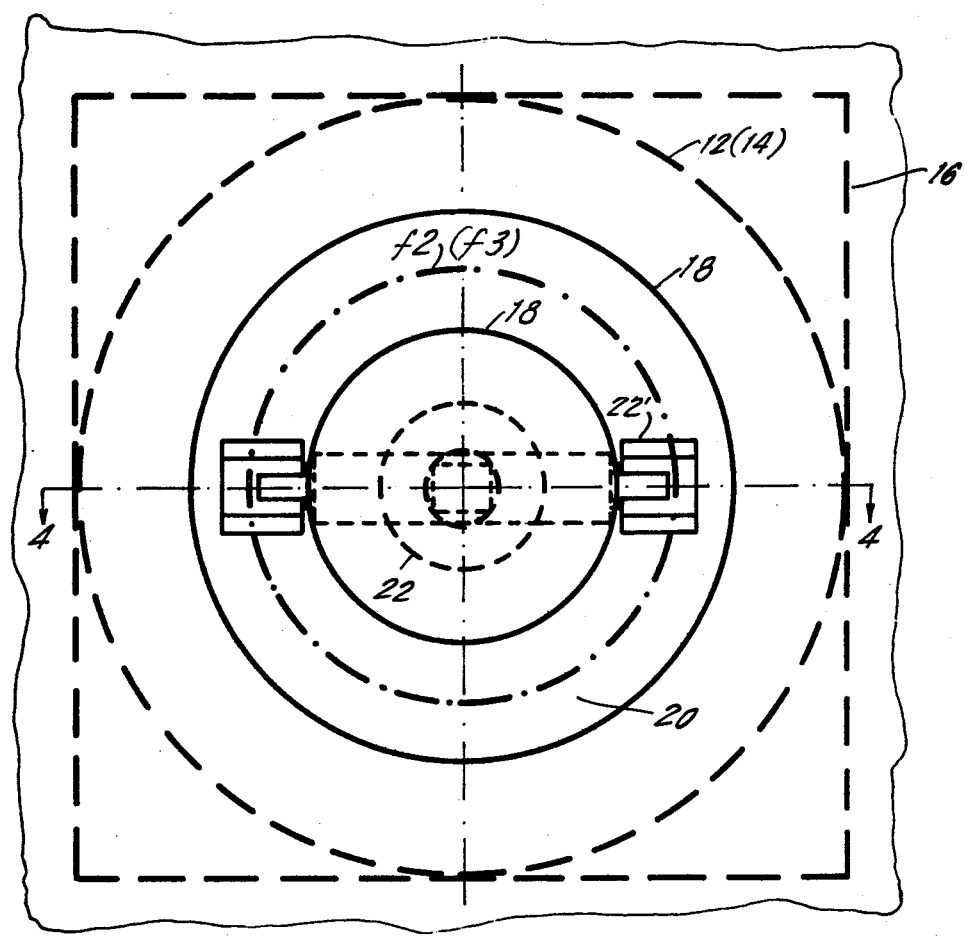
FIG. 4 is a sectional view of the lamp assembly of FIG. 3 taken along lines 4—4.

A first application of the embodiment shown in FIG. 1 is illustrated in FIGS. 3 and 4. In this embodiment, reflector 10 is recessed in a housing 16 located above a ceiling 18. The ceiling 18 is provided with an annular opening 20 which encompasses the focal points $f2$ and $f3$ of reflector sections 14 and 12, respectively. In this embodiment, reflector 10 is symmetrical about a line passing through common focal point $f1$ perpendicular to ceiling 18. More generally, reflector 10 is symmetrical about a line passing through common focal point $f1$ and perpendicular to and passing through a line extending between focal points $f2$ and $f3$. As a result, the cross section of reflector 10 taken along any plane passing through common focal point $f1$ and perpendicular to ceiling 18 consists of two elliptical reflector sections 12 and 14 whose non-common focal points $f3$, $f2$, respectively, lie within annular opening 20 in ceiling 18.

If desired, annular opening 20 can be covered with glass or other transparent or translucent material.

A punctiform light source 22 is located at common focal point $f1$ such that the rays emanating therefrom concentrate along opening 20 at focal points $f2$, $f3$. Alternatively, a short tubular high intensity lamp 22 (such as a mercury vapor or sodium vapor lamp) may be used.

Figure 5:
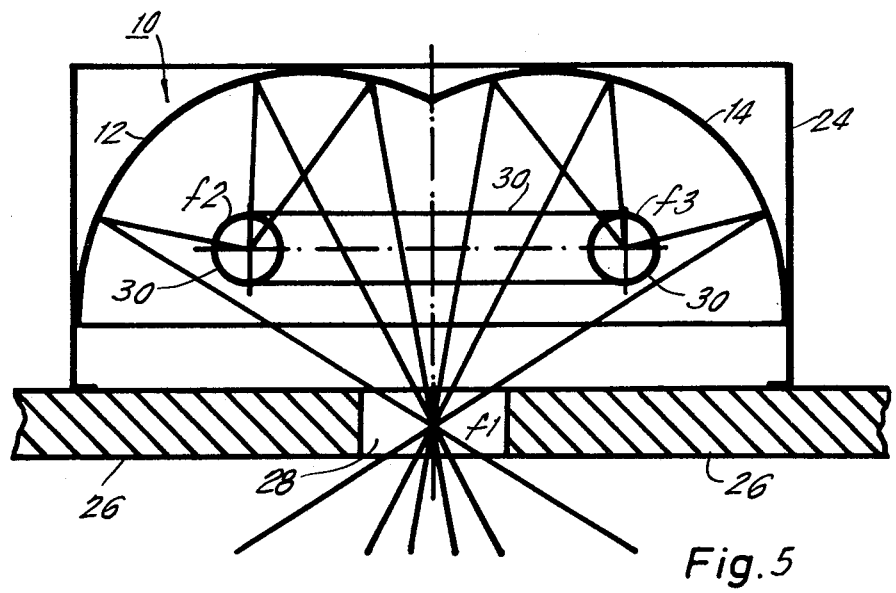
FIG. 5 is a bottom view of a second lamp assembly utilizing a trifocal mirror.
Figure 6:
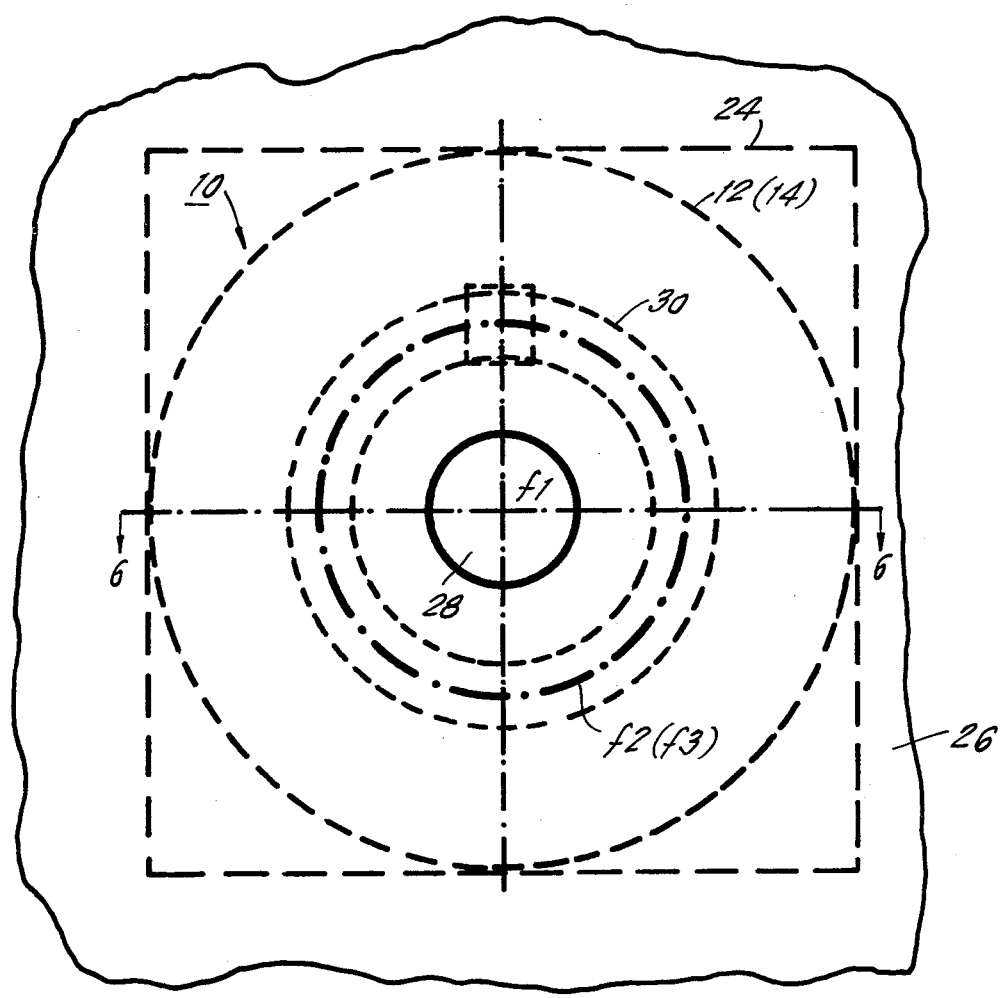
FIG. 6 is a sectional view of the lamp assembly of FIG. 5 taken along lines 6—6.

The embodiment of the invention illustrated in FIG. 1 may also be adapted to form the ceiling lamp illustrated in FIGS. 5 and 6. In this embodiment, the reflector 10 is recessed in a housing 24 located above a ceiling 26. The common focal point $f1$ of reflector sections 12 and 14 is located within a circular opening 28 in ceiling 26. Again, reflector 10 is symmetrical about a line passing through common focal point $f1$ perpendicular to ceiling 26 such that the cross section of reflector 10 taken along any plane passing through focal point $f1$ and perpendicular to ceiling 26 will comprise two electrical reflector sections 12 and 14 as illustrated in FIG. 6.

An annular light source 30, which may be a ring shaped fluorescent tube or high intensity lamp, is located along focal point line $f2$ ($f3$) within housing 24. The light emitted by light source 30 reflects off of reflector 10 and is concentrated at common focal point $f1$ within circular opening 28 in ceiling 26. Circular opening 28 may be covered with glass or other transparent or translucent material if so desired.

In both the embodiments illustrated in FIGS. 3-6 reflector 10 is utilized to create recessed ceiling lamps which produce a narrow luminous surface with a high luminous effect, either as a ring surface or as a luminous disc. While both embodiments have been described as a recessed ceiling unit, it should be obvious to those skilled in the art that these embodiments can easily be adapted to be utilized in standing or other type lamps. In such applications, the ceiling surfaces would be replaced by an appropriate lamp cover containing an annular or circular opening as shown.

Figure 7:
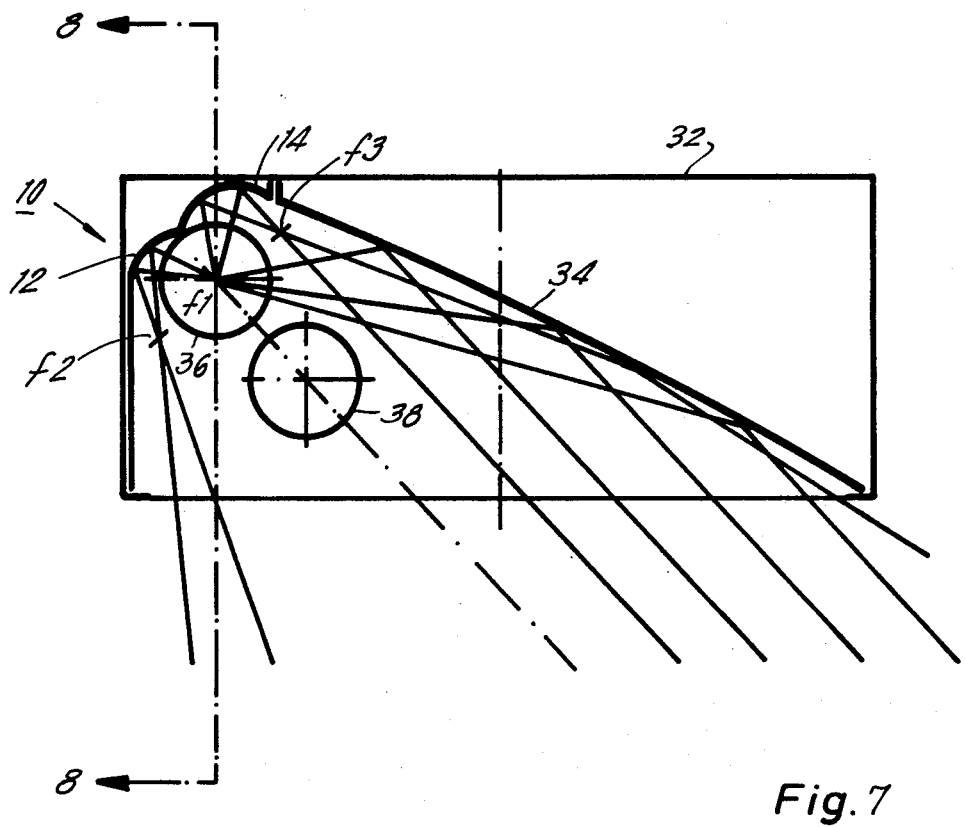
FIG. 7 is a sectional view of a third lamp assembly utilizing a trifocal mirror-reflector.
Figure 8:
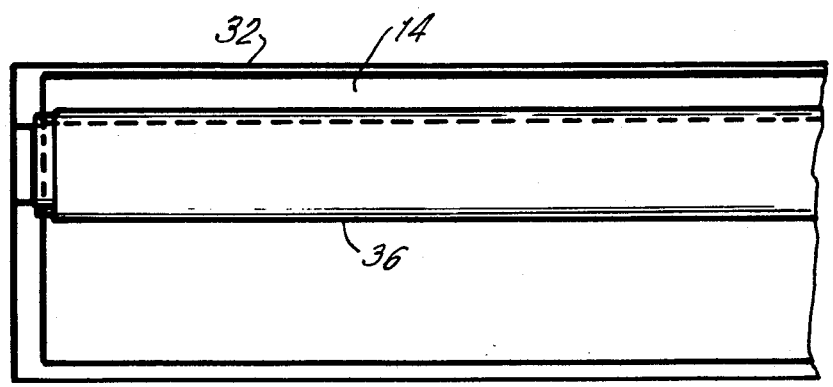
FIG. 8 is a sectional view of the lamp assembly of FIG. 7 taken along lines 8—8.

In the embodiments illustrated in FIGS. 3-6 reflector 10 is symmetrical about a line passing through column focal point $f1$ and perpendicular to the ceiling or lamp cover. In another form of the invention, reflector 10 is elongated along an axis passing through common focal point $f1$ such that reflector 10 is elliptical in cross section only along planes taken perpendicular to the elongated axis. Referring to FIGS. 7 and 8, reflector 10 is recessed in a lamp housing 32 and is elongated along an axis passing through focal point $f1$. More generally, reflector 10 is elongated along an axis passing through focal point $f1$ and perpendicular to but not passing between the non-common focal points $f2$, $f3$ of reflector sections 12, 14.

Reflector 10 may include a third reflector section 34 which depends from reflector section 14 to form an asymmetrical lamp. Reflector section 14 may have a straight, parabolic or hyperbolic cross section. When an elongated light source 36 is placed along the common focal point $f1$ of reflector sections 12 and 14, three different luminous fields are produced which are integrated in the entire luminous field of the asymmetrical lamp.

By providing a second elongated light source 38 parallel to and spaced from elongated light source 36, a more asymmetrical field can be produced. Thus, a first field resulting from light directly emanating from elongated light source 38 and a second field reflected off of reflector section 34 will be added to the first, second and third light fields resulting from light emanating from lamp 36 and reflected off of reflector sections 12, 14 and 34. The asymmetrical nature of this field can further be enhanced by selecting different focal distances $f1$-$f2$ and $f1$-$f3$. When reflector section 34 is parabolic, elongated light source 38 may be placed on a focal point thereof.

Figure 10:
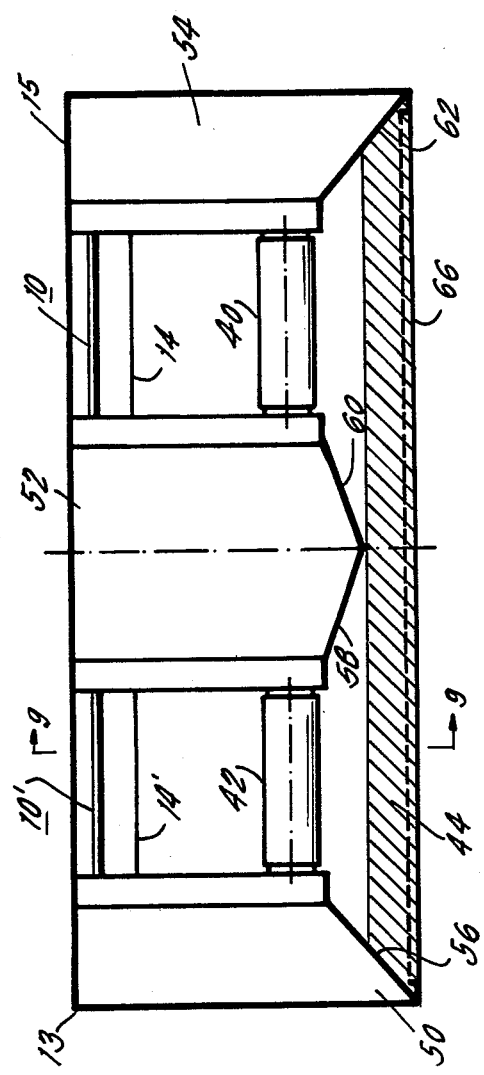
FIG. 10 is a sectional view of the lamp assembly of FIG. 9 taken along lines 10—10.
Figure 9:
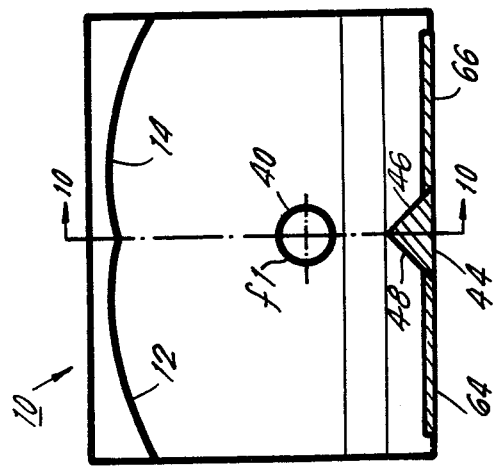
FIG. 9 is a sectional view of a fourth lamp assembly utilizing a trifocal mirror.

Yet another, but related, embodiment of the present invention is illustrated in FIGS. 9 and 10. This embodiment is especially suitable for use in paneled ceilings. In this embodiment, two elongated lamps 40 and 42 are located on the common focal point $f1,f1'$ of reflectors 10,10'. Reflectors 10,10' are elongated along the two axes $f1,f1'$ such that the cross section of the reflectors along any plane perpendicular to axes $f1,f1'$ comprises two reflector sections 12, 14 and 12', 14', respectively.

Directly below each light source 40, 42 is a reflector 44 having sloped reflective surfaces 46, 48 which reflect light emanating from light sources 40, 42 back towards reflectors 10,10'. Reflector 44 is also provided to prevent a direct view of light sources 40, 42 which may be harmful due to possible ultraviolet radiation. Lamp supports 50, 52 and 54 are also provided with reflective surfaces 56, 58, 60 and 62 to provide more efficient light dispersal. Finally, transparent or translucent panels 64, 66 may be disposed on either side of reflector 44.

Figure 11:
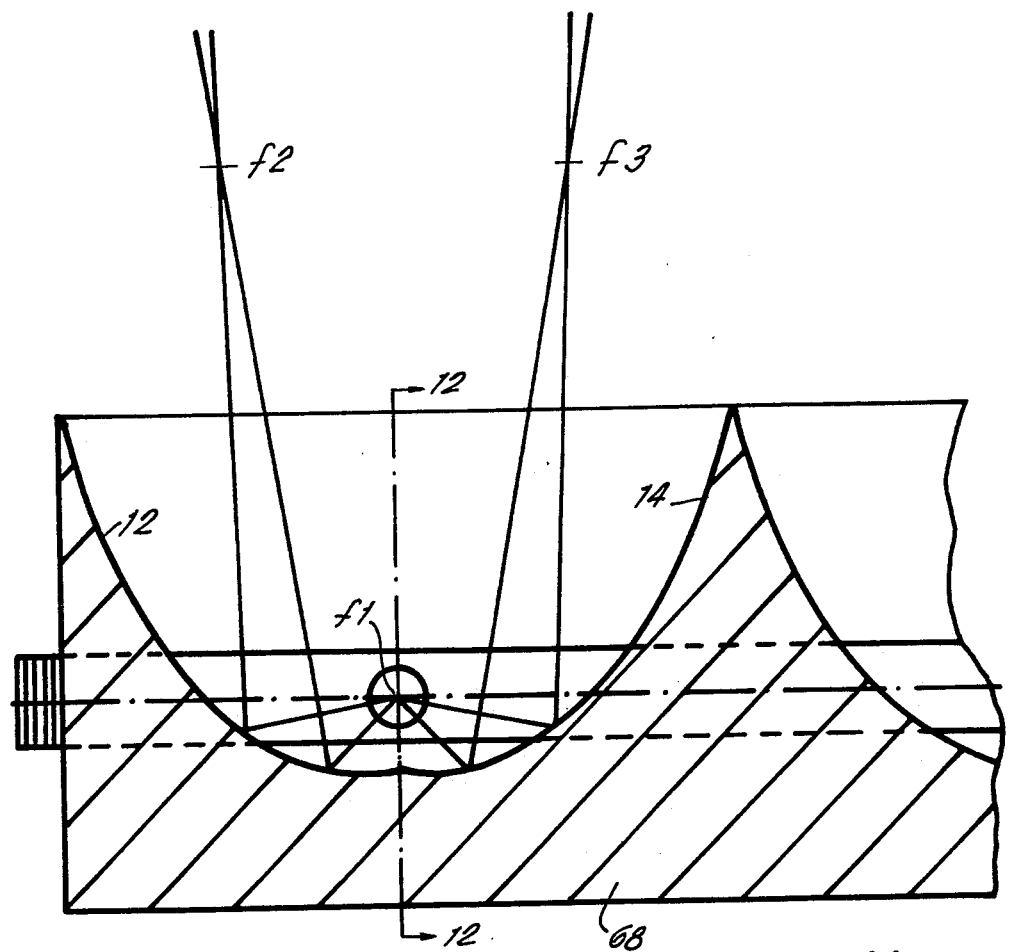
FIG. 11 is a sectional view of a solar reflector utilizing a trifocal mirror.
Figure 12:
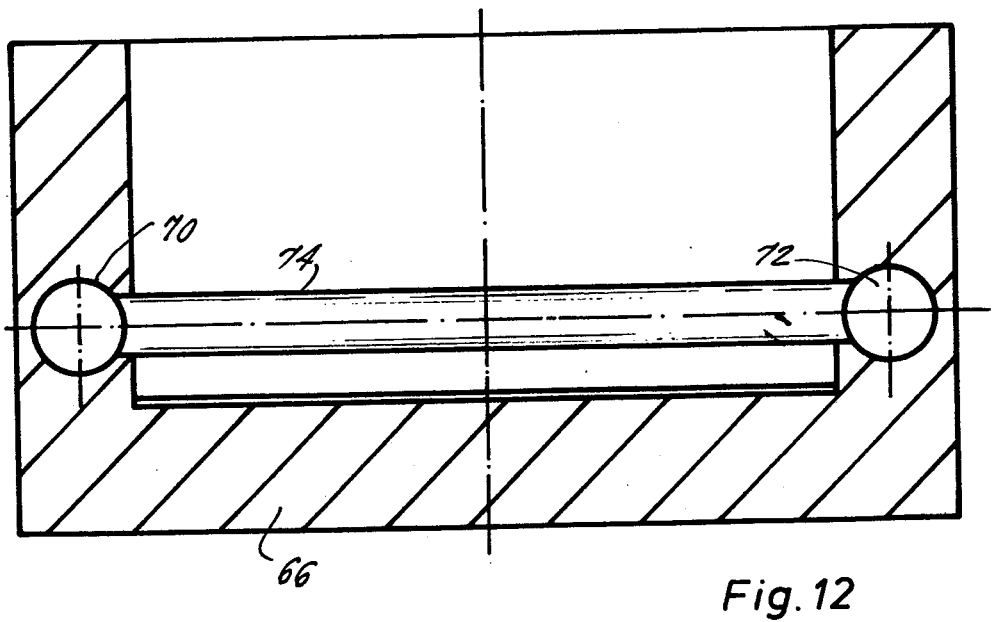
FIG. 12 is a sectional view of the solar collector of FIG. 11 taken along lines 12—12.

In a final embodiment of the present invention, a compound reflector is utilized to concentrate sunlight to heat a liquid or gas substance located at the common focal point of the two reflector sections. Referring to FIGS. 11 and 12, trifocal mirror-reflector 10 is used to collect solar energy at common focal point $f1$. In a similar manner to the embodiment illustrated in FIGS. 7 and 8, reflector 10 is symmetrical about an axis passing through common focal point $f1$ and perpendicular to a line passing through focal points $f2$ and $f3$. Refective sections 12 and 14 are formed on an insulative substrate 68 which may support a plurality of reflectors. Liquid or gas to be heated runs through conduits 70 and 72 which run the length of insulative substrate 68 and are connected to a conduit 74 located along the common focal point $f1$ of each reflector 10.

The sun rays are collected at the focal point axis $f1$ and heat the liquid or gas circulating in conduit 74. The heated liquid or gas is then fed through conduits 70, 72 to a heat exchanger and used in any desired manner such as in a hot water plant.

Reflectors 10 can also be used directly for heating the water of a swimming pool in which case the conduits 70-74 would be eliminated. The reflectors can either be embedded into the bottom of the pool or can be arranged to float in the water. The lower the axis of the focal point in the water, the more effectively the reflector will heat the water.

The present invention may be embodied in other specific forms without departing from the spirit or essential attributes thereof and, accordingly, reference should be made to the appended claims, rather than to the foregoing specification as indicating the scope of the invention.

What is claimed is:

1. A compound reflector having a cross section, which cross section comprises:
   a first reflector section formed along an arc of a first ellipse, said first ellipse having a proximal and a distal focal point;
   a second reflector section formed along an arc of a second ellipse, said second ellipse having a proximal and a distal focal point;
   said first and said second ellipses sharing a common focal point;
   the focal length of said first reflector section, as defined between said proximal and said distal focal point of said first reflector section, and the focal length of said second reflector section, as defined between the proximal and distal focal points of said second reflector section, being unequal.

2. A compound reflector as in claim 1 wherein said common focal point is the proximal focal points of said first and said second ellipses.

3. A compound reflector as in claim 1 where said common focal point is the distal focal points of said first and said second ellipses.

4. A compound reflector as in claim 1 including a light source located at said common focal point.

5. A compound reflector as in claim 1 wherein said reflector is elongated along an axis passing through said common focal point and running perpendicular to said non-common focal points of said ellipses such that the cross section of said compound reflector meets the limitations of claim 1 along substantially all planes running perpendicular to said axis.

6. A compound reflector as in claim 5 wherein the cross section of said reflector along substantially all planes of said axis further comprises a third reflector section, said third reflector section depending from one of said first or second reflector sections and being non-elliptical, whereby said compound reflector emits asymmetric light.

7. A compound reflector as in claim 6 wherein said third reflector section is parabolic.

8. A compound reflector section as in claim 6 wherein said third reflector section is hyperbolic.

9. A compound reflector as in claim 6 including an elongated light source located along said axis.

10. A compound reflector as in claim 9 including a second elongated light source parallel to and spaced from said first light source.

11. A compound reflector as in claim 10 wherein said third reflector section is parabolic and wherein said second light source is located on a focal point of said third reflector section.

12. A compound reflector as in claim 5 including a conduit adapted to contain a gas or liquid material running along said axis.

13. A compound reflector as in claim 5, wherein said reflector is adapted to serve as a solar heater; means provided, at least along said axis, for being heated by the radiation reflected from said reflector sections.

14. A lamp comprising:
a lamp housing;
a cover for said lamp housing;
a compound reflector situated within said housing, said compound refector having a cross section which comprises a first reflector section formed along an arc of a first ellipse, said first ellipse having a proximal and a distal focal point, a second reflector section formed along an arc of a second ellipse, said second ellipse having a proximal and a distal focal point, said first and second ellipses sharing a common focal point, said compound reflector being symmetrical about an axis passing through said common focal point and both passing through and perpendicular to a line extending between the remaining two focal points of said first and second ellipses, said common focal point being the proximal focal points of said first and second ellipses; and
a punctiform light source located at said common focal point.

15. A lamp as in claim 14 wherein said cover is substantially opaque except for an at least translucent annular section surrounding the non-common focal points of said compound reflector.

16. A lamp as in claim 14 and further comprising a light shield located on said housing at the side thereof away from said reflector sections and positioned to block direct viewing of said light source from below said housing, but so shaped as to not block viewing of the remaining two said focal points from below and outside said housing.

17. A lamp comprising:
a lamp housing;
a cover for said lamp housing;
a compound reflector situated within said housing, said compound reflector having a cross section which comprises a first reflector section formed along an arc of a first ellipse, said first ellipse having a proximal and a distal focal point, a second reflector section formed along an arc of a second ellipse, said second ellipse having a proximal and a distal focal point, said first and second ellipses sharing a common focal point, said compound reflector being symmetrical about an axis passing through said common focal point and both passing through and perpendicular to a line extending between the remaining two focal points of said first and second ellipses, said common focal point being the distal focal point of said first and second reflector sections; and
a circular light source located along an arc defining the non-common focal points of said compound reflector.

18. A lamp as in claim 17 wherein said cover is substantially opaque except for an at least translucent section surrounding said common focal point.

* * * * *